3,321,369
METHOD OF ENHANCING LEARNING RATE AND RETENTION LEVEL IN WARM BLOODED ANIMALS

Alvin J. Glasky, Lincolnwood, and Nicholas P. Plotnikoff, Lake Bluff, Ill., assignors to Abbott Laboratories, North Chicago, Ill., a corporation of Illinois
No Drawing. Filed May 26, 1965, Ser. No. 459,103
3 Claims. (Cl. 167—65)

This invention relates to a method of stimulating ribonucleic acid synthesis and in particular to a method of improving impaired learning ability or impaired retention in mammals.

While it is not intended to rely upon any particular theory to explain the therapeutic effectiveness of the method of the present invention, the hypothesis has been advanced that ribonucleic acid (RNA) is the substrate for memory (Hyden, H., 1955, "Nucleic Acid and Proteins," Neurochemistry, pp. 222–224) since, by the rearrangement of the four bases of ribonucleic acid, many combinations of the molecule are possible, thereby allowing $10^{15}$ or more bits of information to be encoded. Cameron, D. E. (1963), "The Process of Remembering," Brit. J. Psych. 109: 325–340 reports that the administration of ribonucleic acid (RNA), both in oral and intravenous form, at least with the former resulted in some evidence of amelioration of memory deficits in aged individuals being studied. The intravenous solutions produced severe shock-like reactions.

It has been found that the administration to warm-blooded animals of p-amino-N-(2-diethylaminoethyl) benzamide or its neutral or acid addition salts results in an increased rate of learning by the animal together with a prolonged period of rentention of the learned behavior. It is believed that the enhanced learning and prolonged memory effect of these compounds may be due to their stimulation of brain ribonucleic acid synthesis. Thus, the noted compounds are useful in conditions such as impaired learning ability or impaired retention and for those conditions where enhanced synthesis of cellular ribonucleic acid would be beneficial.

The following examples are presented in order to more fully disclose the invention. It should be understood, however, that the examples are not intended to limit the invention in any way.

Example I

To determine whether or not the noted compounds cause an in vivo stimulation of a ribonucleic synthesizing enzyme, p-amino-N-(2-diethylaminoethyl) benzamide sulfate was administered to female rats. One day after administration (20 mg./kg., daily by gavage) was begun, the animals were mated. Twenty-one days later, the pregnant animals were sacrificed and brain tissue was removed from the fetuses. A nuclear aggregate enzyme was prepared from the brain tissue and found to incorporate a radioactively labeled RNA precursor (nucleoside triphosphate) into RNA. Incorporation of nucleoside triphosphate into RNA was not observed with a nuclear aggregate enzyme derived from control animals (saline treated) not pretreated with p-amino-N-(2-diethylaminoethyl) benzamide sulfate. The procedure was repeated with the acid sulfate and with p-amino-N-(2-diethylaminoethyl) benzamide hydrochloride. The same results were obtained in each case.

Thus, it has been shown that the noted compounds cause in vivo stimulation of an RNA synthesizing enzyme.

Example II

To assay the increased synthesis of RNA in the intact rat brain, a radioactively labeled precursor of nucleic acid (orotic acid-$C^{14}$) was injected intracranially at various times after the intraperitoneal administration of p-amino-N-(2-diethylaminoethyl) benzamide sulfate, acid sulfate or hydrochloride. The animals were later sacrificed and the amount of RNA synthesized in vivo was measured, i.e., the amount of radioactive precursor converted into nucleic acid was measured. A marked stimulation in the amount of RNA synthesized in vivo as early as 15–30 minutes after administration of the drug was found. The product synthesized was identified as RNA.

As can be seen, p-amino-N-(2-diethylaminoethyl) benzamide sulfate, acid sulfate or hydrochloride caused an in vivo stimulation of RNA synthesis.

Example III

A nuclear aggregate enzyme was isolated from brain tissue derived from non-treated adult rats. The enzyme was inactive when tested in the normal assay procedure. However, when p-amino-N-(2-diethylaminoethyl) benzamide sulfate, acid sulfate or hydrochloride was added to the system, in vitro, the enzyme activity was markedly stimulated. Thus, an in vitro stimulation of an RNA synthesizing system was accomplished.

Synthesis of RNA is essential to the functioning of all cells and is catalyzed by the enzyme, RNA polymerase. Essentially, in vitro and in vivo data have been obtained which show the stimulation of fetal rat brain RNA synthesis by the administration of p-amino-N-(2-diethylaminoethyl) benzamide sulfate, acid sulfate or hydrochloride through an apparent activation of brain RNA polymerase.

The behavioral effects resulting from administration of the noted drugs were evaluated on a modification of the Cook-Weidley apparatus (L. Cook and E. Weidley, Ann. N.Y. Acad. Sci., 66, 740, 1957). Essentially, such apparatus consists of a chamber with a grid flooring and an escape platform outside the chamber. Several different training schedules for conditioned avoidance were employed. Each training trial consisted of 30 seconds of buzzer and electric shock stimulation to the rat in the chamber. Subsequent test trials (acquisition trials) consisted of 15 seconds in the chamber without any stimulation followed by 10 seconds of buzzer stimulation and culminated by 5 seconds of buzzer plus shock stimulation. The time from entrance into the apparatus until the rat jumps out is recorded as the escape time. Five or ten test trials or retention trials were employed each day. Retention trials were conducted by testing the animals' escape response in the test chamber during a 30-second time period without stimulation of any kind. The test sequence for any given trial was terminated upon successful completion of the task.

Example IV

ONE TRAINING TRIAL

| Trial | p-Amino-N-(2-diethyl-aminoethyl)benzamide·HCl, 20 mg./kg. I.P.[1] | | p-Aminobenzoyl diethyl-amino ethanol, 20 mg./kg. I.P. | | o-Chloro-p-amino N-(diethylaminoethyl)benz-amide, 20 mg./kg. I.P. | | d-N-α-dimethylphen-ethyl amine hydrochloride, 1.0 mg./kg. I.P.[1] | | Controls | |
|---|---|---|---|---|---|---|---|---|---|---|
| | Test Trials (Day 1), sec. | Retention Trials (Day 2), sec.[2] | Test Trials (Day 1), sec. | Retention Trials (Day 2), sec. | Test Trials (Day 1), sec. | Retention Trials (Day 2), sec. | Test Trials (Day 1), sec. | Retention Trials (Day 2), sec. | Test Trials (Day 1), sec. | Retention Trials (Day 2), sec. |
| 1 | 15.0 | 3.7 | 13.5 | 15.3 | 17.2 | 23.3 | 9.3 | 17.5 | 15.3 | 26.4 |
| 2 | 7.2 | 3.5 | 12.3 | 17.2 | 10.2 | 18.3 | 16.2 | 25.0 | 16.5 | 24.3 |
| 3 | 6.5 | 4.2 | 11.7 | 17.7 | 13.0 | 12.5 | 11.8 | 22.7 | 11.8 | 22.4 |
| 4 | 6.3 | 4.2 | 12.5 | 17.8 | 11.8 | 14.6 | 8.5 | 21.2 | 17.8 | 19.8 |
| 5 | 4.8 | 3.5 | 9.7 | 22.3 | 13.3 | 16.8 | 8.8 | 26.0 | 21.2 | 25.0 |
| 6 | 9.3 | 2.7 | 12.3 | 24.7 | 15.8 | 20.7 | 10.7 | 28.5 | 11.2 | 24.5 |
| 7 | 3.2 | 2.7 | 15.0 | 26.7 | 16.5 | 17.8 | 10.5 | 30.0 | 11.0 | 23.0 |
| 8 | 5.5 | 2.7 | 12.3 | 26.2 | 15.2 | 16.5 | 10.7 | 30.0 | 14.8 | 23.8 |
| 9 | 4.5 | 2.8 | 12.5 | 25.2 | 13.2 | 14.0 | 11.2 | 19.0 | 12.5 | 21.0 |
| 10 | 5.0 | 2.7 | 13.2 | 27.0 | 14.0 | 11.8 | 12.2 | 17.5 | 14.2 | 25.0 |
| | 6.7±1.0 | 3.3±0.5 | 12.7±2.4 | 22.0±4.2 | 14.0±2.1 | 16.6±2.5 | 11.0±1.7 | 23.7 | 14.6±2.2 | 23.5±3.5 |

[1] Drug administered intraperitoneally 15 minutes prior to training trial.
[2] Average escape time for groups of 6 rats.

Example V

ONE TRAINING TRIAL

| Trial | 2-dimethylamino ethanol, 50 mg./kg. I.P.[1] | | Controls | |
|---|---|---|---|---|
| | Test Trials (Day 1), sec.[2] | Retention Trials (Day 2), sec. | Test Trials (Day 1), sec. | Retention Trials (Day 2), sec. |
| 1 | 14.7 | 18.0 | 19.7 | 19.8 |
| 2 | 14.5 | 11.6 | 10.2 | 20.2 |
| 3 | 12.0 | 11.8 | 11.5 | 25.0 |
| 4 | 12.8 | 13.8 | 16.5 | 28.3 |
| 5 | 12.8 | 10.1 | 17.8 | 18.8 |
| 6 | 15.2 | 10.6 | 18.0 | 19.6 |
| 7 | 13.5 | 9.6 | 12.2 | 16.6 |
| 8 | 12.7 | 10.6 | 14.0 | 19.3 |
| 9 | 12.3 | 6.6 | 14.0 | 13.1 |
| 10 | 10.7 | 7.8 | 16.2 | 11.8 |
| | 13.1±1.4 | 11.1±1.2 | 15.0±1.6 | 18.4±2.0 |

[1] Drug administered intraperitoneally 15 minutes prior to training trial.
[2] Average escape time for groups of 6 rats.

Example VI

ONE TRAINING TRIAL

| Trial | Controls | | p-Amino-N-(2-diethylamino-ethyl) benzamide·½ H₂SO₄, 20 mg./kg. I.P. | |
|---|---|---|---|---|
| | Test Trials (Day 1), sec.[1] | Retention Trials (Day 2), sec. | Test Trials (Day 1), sec. | Retention Trials (Day 2), sec. |
| 1 | 20.7 | 18.0 | 18.2 | 10.8 |
| 2 | 19.5 | 23.8 | 14.8 | 4.3 |
| 3 | 15.0 | 22.0 | 14.0 | 4.5 |
| 4 | 15.0 | 17.8 | 11.7 | 6.0 |
| 5 | 16.3 | 23.4 | 7.5 | 4.8 |
| 6 | 15.5 | 24.8 | 8.8 | 3.3 |
| 7 | 14.8 | 25.8 | 6.5 | 4.8 |
| 8 | 13.8 | 23.2 | 6.7 | 5.5 |
| 9 | 15.8 | 26.2 | 7.2 | 4.2 |
| 10 | 16.2 | 26.7 | 5.5 | 4.2 |
| | 16.3±1.8 | 23.2±2.5 | 10.1±1.1 | 5.2±0.5 |

[1] Average escape time for groups of 6 rats.

Example VII

FIVE TRAINING TRIALS

| Group | Number of rats | Dose, mg./kg. | 1st day | 2nd day | 3rd day | 4th day | 5th day |
|---|---|---|---|---|---|---|---|
| A | 12 | 20 | ([1]) | 5.3±0.9 | 4.5±0.8 | 4.1±0.7 | 2.7±0.5 |
| B | 12 | 20 | ([1]) | 6.9±1.2 | 3.9±0.7 | 4.2±0.8 | 4.6±0.8 |
| Controls | 12 | 0 | ([1]) | 10.0±1.8 | 10.6±1.9 | 9.1±1.6 | 10.5±1.9 |

[1] Five training trials.
Group A: Drug [p-amino-N-(2-diethylaminoethyl) benzamide·HCl] injected end of test period each day.
Group B: One injection [p-amino-N-(2-diethylaminoethyl) benzamide·HCl] only, prior to testing first day.

Example VIII

FIVE TRAINING TRIALS

| Number of rats | Dose [p-amino-N-(2-diethylamino ethyl) benzamide·HCl] I.P.[1] | Test Trials | | | | | | |
|---|---|---|---|---|---|---|---|---|
| | | 2nd Day, sec.[2] | 3rd Day, sec. | 4th Day, sec. | 5th Day, sec. | 2nd Week, sec. | 3rd Week, sec. | 8th Week, sec. |
| 12 | 20 mg./kg. | 7.8±1.4 | 4.8±0.9 | 4.3±0.8 | 3.2±0.6 | 3.8±0.7 | 3.3±0.6 | 3.8±0.7 |
| 12 | 50 mg./kg. | 7.2±1.3 | 4.7±0.8 | 3.1±0.6 | 3.0±0.5 | 3.1±0.6 | 3.4±0.6 | 4.9±0.9 |
| 12 | Controls | 10.0±1.8 | 9.3±1.6 | 8.9±1.6 | 9.9±1.8 | 11.6±2.1 | 8.3±1.5 | 11.0±2.0 |

[1] Drug administered intraperitoneally 15 minutes prior to first training trial.
[2] Average escape time for group of 12 rats in 5 test trials.
Overall averages: 20 mg./kg., 4.4±0.4; 50 mg./kg., 4.2±0.4; Controls, 9.9±1.0.

Example IX

| Trial | p-Amino-N-(2-diethyl-aminoethyl) benzamide, 20 mg./kg. I.P. | | Controls | | p-Amino-N-(2-diethyl-aminoethyl) benzamide·H$_2$SO$_4$, 20 mg./kg. I.P. | |
|---|---|---|---|---|---|---|
| | Test Trial (Day 1) sec. | Retention Trial (Day 2), sec. | Test Trial (Day 1), sec. | Retention Trial (Day 2), sec. | Test Trial (Day 1), sec. | Retention Trial (Day 2), sec. |
| 1 | 12.3 | 7.0 | 16.2 | 13.0 | 14.6 | 7.3 |
| 2 | 11.8 | 8.0 | 15.1 | 7.5 | 13.0 | 9.1 |
| 3 | 8.7 | 5.1 | 15.5 | 9.0 | 12.8 | 9.0 |
| 4 | [1] 5.2 | 6.1 | 12.8 | 13.1 | 7.8 | 11.0 |
| 5 | | 9.3 | 12.6 | 9.8 | [1] 7.8 | 7.8 |
| 6 | | 6.6 | 11.8 | 11.5 | | 7.8 |
| 7 | | 8.3 | 13.0 | 13.5 | | 6.3 |
| 8 | | 5.0 | 14.1 | 12.8 | | 5.0 |
| 9 | | 4.8 | 11.8 | 11.6 | | 5.1 |
| 10 | | 4.3 | [1] 12.1 | 11.8 | | 5.1 |

[1] All test animals learned to escape within fifteen seconds.

Example X

ORAL ADMINISTRATION, p-AMINO-N-(2-DIETHYLAMINOETHYL)BENZAMIDE·HCl, ONE HOUR PRETREATMENT

| Trial | 20 mg./kg. | | 50 mg./kg. | | Controls | |
|---|---|---|---|---|---|---|
| | Test Trial (Day 1), sec. | Retention Trial (Day 2), sec. | Test Trial (Day 1), sec. | Retention Trial (Day 2), sec. | Test Trial (Day 1), sec. | Retention Trial (Day 2), sec. |
| 1 | 17.5 | 6.8 | 16.0 | 5.8 | 19.1 | 8.5 |
| 2 | 12.6 | 7.1 | 13.8 | 4.5 | 13.1 | 9.3 |
| 3 | 8.1 | 5.8 | [1] 6.7 | 3.5 | 10.3 | 9.3 |
| 4 | [1] 5.8 | 5.3 | | 4.8 | 12.1 | 10.7 |
| 5 | | 5.8 | | 4.5 | 10.5 | 9.7 |
| 6 | | 5.6 | | 4.6 | 11.6 | 11.5 |
| 7 | | 5.8 | | 4.0 | 9.8 | 10.7 |
| 8 | | 4.6 | | 4.6 | 9.5 | 11.8 |
| 9 | | 3.5 | | 4.3 | [1] 7.3 | 11.1 |
| 10 | | 5.6 | | 2.8 | | 14.3 |

[1] All test animals learned to escape within fifteen seconds.

The foregoing examples show a markedly shortened escape time in both the test and retention trials in rats treated with p-amino-N-(2-diethylaminoethyl) benzamide or its neutral or acid addition salts over a dosage range of 10 to 50 mg./kg. intraperitoneally and 20 to 100 mg./kg. orally. Pretreatment of the rats during the training trials both orally and intraperitoneally resulted in markedly increased acquisition rates in comparison to control rats treated with saline solution. Post-treatment of rats following training resulted in markedly prolonged retention of learned performance, up to eight weeks following drug administration. Comparable studies carried out with p-aminobenzoyldiethylaminoethanol, o-chloro-p-amino-N-(diethylaminoethyl) benzamide, d-N-α-dimethylphenethylamine, and 2-dimethylaminoethanol did not show any significant increase in acquisition rate or retention level of avoidance response compared to saline-treated animals.

All forms of p-amino-N-(2-diethylaminoethyl) benzamide; that is, base, sulfate, acid sulfate, and hydrochloride salts, were found to be effective in accelerating acquisition rates of avoidance responses as well as increasing retention levels of these responses over prolonged periods of time. The optimal dose in all forms was found to be 20 mg./kg. The minimum effective dose was found to be 10 mg./kg.

On the basis of the biochemical and behavioral effects resulting from the administration of the noted compounds, therapeutic utility has been demonstrated in the enhancement of learning performance and retention; acceleration of normal cellular processes and functions dependent on ribonucleic acid metabolism; all clinical conditions wherein enhanced ribonucleic synthesis would be beneficial, including but not limited to, deceleration of degenerative aging processes, accelerated tissue repair and accelerated synthesis of cellular components; and psychiatric clinical conditions where performance is impaired.

In the foregoing examples, the compounds were administered by dispersing the compounds in a liquid carrier. It should be understood, however, that the present invention contemplates providing the active compound in the form of a granulation, tablets, capsules, elixirs, amulsions, and other dosage forms well known to the art.

Example XI

In illustration of the tablet dosage form, the following is a formula for 100 tablets:

| | Grams |
|---|---|
| Sulfuric acid, acid-addition salt of p-amino-N-(2-diethylaminoethyl) benzamide | 20 |
| Lactose | 17 |
| Corn starch | 10.5 |
| Talc | 2 |
| Magnesium stearate | 0.5 |
| | 50.0 |

The tablets are prepared by mixing the acid-addition salt to p-amino-N-(2-diethylaminoethyl) benzamide with lactose, moistening and screening. The mixture is granulated with a corn starch paste made by dissolving 3 grams of corn starch in 30 cc. of water. The granulated mixture is then dried throughly. To the granulation is added the talc, magnesium stearate, and the remainder of the corn starch. After thorough mixing, the tablets are compressed in a conventional tabletting machine. Each tablet will provide 200 mg. of active ingredient.

Example XII

A suitable capsule mixture formula for 100 capsules is as follows:

| | Grams |
|---|---|
| Hydrochloric acid, acid-acid addition salt of p-amino-N-(2-diethylaminoethyl) benzamide | 10 |
| Lactose | 10 |

The ingredients are thoroughly mixed and placed in a gelatin capsule. Each capsule will provide 100 milligrams of active ingredient.

*Example XIII*

An aqueous solution for injection can be made by dissolving 1 gram of p-amino-N-(2-diethylaminoethyl) benzamide in 500 ml. of sterile water. The solution is then filled into 5 ml. ampoules which are sealed and sterilized. Each ampoule will contain 10 mg. of active ingredient.

The compounds of this invention have been found to be effective when administered orally to rats in the dosage range of from 20 to 100 mg./kg. but can be administered orally to other warm-blooded animals in the dosage range of about 100 to 300 mg. per day. A convenient method is to administer the total daily dose in three equal dosage forms. In smaller animals other than rats, usually about half the above dose will suffice, i.e., from about 25 mg. to about 75 mg. per day.

Others may practice the invention in any of the numerous ways which will be suggested by this disclosure to one skilled in the art. All such particles of the invention are considered to be a part thereof provided they fall within the scope of the appended claims.

What is claimed is:
1. The method of enhancing learning rate and retention level impairment in warm-blooded animals which comprises administering to a warm-blooded animal having said impairment from about 10 to 300 milligrams daily of an active ingredient selected from the group consisting of p-amino-N-(2-diethylaminoethyl) benzamide and its neutral or acid addition salt.
2. The method as defined in claim 1 wherein the active ingredient comprises the sulfuric acid, acid addition salt of p-amino-N-(2-diethylaminoethyl) benzamide.
3. The method as defined in claim 1 wherein the active ingredient comprises the hydrochloric acid, acid addition salt of p-amino-N-(2-diethylaminoethyl) benzamide.

References Cited by the Examiner

American Drug Index, (1962), page 626, J. B. Lippencott Company, Philadelphia and Montreal.

Merck Index, (7th edition, 1960) page 853.

ALBERT T. MEYERS, *Primary Examiner.*

JULIAN S. LEVITT, *Examiner.*

N. G. MANN, STANLEY J. FRIEDMAN,
*Assistant Examiners.*